United States Patent
Lee et al.

(10) Patent No.: US 9,301,148 B2
(45) Date of Patent: Mar. 29, 2016

(54) METHOD AND APPARATUS FOR REDUNDANCY OF WIRELESS COMMUNICATION NETWORK

(71) Applicant: ELECTRONICS AND TELECOMMUNICATIONS RESEARCH INSTITUTE, Daejeon (KR)

(72) Inventors: Nam-Suk Lee, Daejeon (KR); Sook-Jin Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 105 days.

(21) Appl. No.: 14/259,808

(22) Filed: Apr. 23, 2014

(65) Prior Publication Data

US 2014/0323139 A1    Oct. 30, 2014

(30) Foreign Application Priority Data

Apr. 24, 2013    (KR) .......................... 10-2013-0045585

(51) Int. Cl.
  *H04W 16/06*   (2009.01)
  *H04W 16/12*   (2009.01)

(52) U.S. Cl.
  CPC .............. *H04W 16/06* (2013.01); *H04W 16/12* (2013.01)

(58) Field of Classification Search
  CPC ........................................................ H04W 16/06
  USPC .......................................................... 455/447
  See application file for complete search history.

(56) References Cited

U.S. PATENT DOCUMENTS

2010/0197314 A1*  8/2010  Maaref ................. H04W 16/04
                                                          455/450
2010/0330994 A1* 12/2010  Matsuo ............... H04J 11/0069
                                                          455/436

FOREIGN PATENT DOCUMENTS

KR    10-2007-0097784 A    10/2007
KR    10-2009-0004165 A     1/2009
KR    10-2009-0098154 A     9/2009

* cited by examiner

*Primary Examiner* — Chuong A Ngo
(74) *Attorney, Agent, or Firm* — Rabin & Berdo, P.C.

(57) ABSTRACT

The method for redundancy of a wireless communication network according to the embodiment of the present invention includes: partitioning the same frequency band of a first base station transceiver subsystem and a second base station transceiver subsystem, which form redundant cell coverage, into a plurality of resource blocks; partitioning each of the partitioned resource blocks into a first frequency partition (FP) and a second frequency partition which are configured to have the same structure as each other; and transmitting and receiving, by the first base station transceiver subsystem, data using a first resource block allocated to the first frequency partition and by the second base station transceiver subsystem, data using a second resource block allocated to the second frequency partition.

18 Claims, 9 Drawing Sheets

METHOD AND APPARATUS FOR REDUNDANCY OF WIRELESS COMMUNICATION NETWORK

CROSS REFERENCE TO RELATED APPLICATION

This application claims the benefit of Korean Patent Application No. 10-2013-0045585, filed on Apr. 24, 2013, which is hereby incorporated by reference in its entirety into this application.

BACKGROUND OF THE INVENTION

1. Technical Field

The present invention relates to a method and an apparatus for redundancy of a wireless communication network, and more particularly, to a method for efficiently constructing a resource block in a structure for redundancy of a railway wireless communication network of which the reliability and stability need to be secured and a method and an apparatus for redundancy of a wireless communication network capable of improving a wireless signal quality.

2. Description of the Related Art

At present, instead of the existing train control system in which wayside devices are connected to each other in a wired manner, a safe and simple radio frequency communication based train control (CBTC) system which newly constructs control sharing of a wayside device and an onboard device has been developed and practically used in some countries. In the future, with the tendency of technology development, the radio frequency communication based train control and communication system is likely to be more widely applied to a railroad.

The CBTC system is equipped in the wayside device and the onboard device board and provides continuous communication between the wayside device and the onboard device to secure stability of a train service. Further, comparing with the traditional wired based signal control system, the CBTC system may shorten a headway to increase a transport capacity and may provide data communication between a train and a central control system to increase operation efficiency of a train and to optimize stability and convenience of a railroad.

In Europe, the radio frequency CBTC system uses a GSM-R which is allocated with some of frequencies in a GSM band for a railway and in some countries including USA, the radio frequency CBTC system uses the IEEE 802.11 standard of a 2.4 GHz band industrial scientific medical (ISM) band for a train control. The wireless communication of the CBTC system which is used in the national Shin-Bundang line, and the like uses an ISM band of 2.4 GHz and the CTBC system using the ISM band is planned to be additionally installed in the future.

However, the radio frequency communication based train control (RF-CBTC) system using the ISM band is difficult to continuously secure performance due to interference, crosstalk, and the like in terms of characteristics of the 2.4 GHz band and therefore the train service may stop. To cope with the above problem, it is necessary to secure a railway only frequency. Considering the 2.4 GHz band which is used in the country, operational uncertainty may occur due to the interference and the crosstalk. Therefore, to stably operate the train service, it is very necessary to secure the railway only frequency for safely and pleasantly operating a railway traffic service in spite of a difficulty in a frequency allocation procedure and period for a stable train operation.

Recently, however, it is difficult to be allocated with many frequency domains for a railway when wireless data are explosively increased. In particular, it is necessary to construct redundancy of a railway network and a cell coverage to immediately cope with emergency situations. In conclusion, in the existing LTE system, a two-fold frequency is required to remove frequency interference between neighboring base station transceiver subsystems for a railway communication network. In this case, to implement the redundancy of the train control signal with a low transmission amount, a frequency two times as large as the existing required amount is required and therefore frequency efficiency may be suddenly reduced. Meanwhile, Korean Patent Publication No. 2009-0004165, etc., discloses only the redundancy to increase a capacity of transmission rate and therefore there is a need for a technology to increase efficiency and stability of a frequency.

SUMMARY OF THE INVENTION

Accordingly, the present invention has been made keeping in mind the above problems occurring in the conventional art, and an object of the present invention is to construct an efficient wireless communication network by performing frequency allocation using the same cell identification, in a redundancy structure of a railway wireless communication network of which the reliability and stability need to be secured.

Another object of the present invention is to provide improve a wireless signal quality by effectively disposing a radio unit.

Still another object of the present invention is to provide receiver sensitivity by synchronizing signals from each of the base station transceiver subsystems in a redundancy structure of a railway wireless communication network of which the reliability and stability need to be secured.

In accordance with an aspect of the present invention, there is provided a method for redundancy of a wireless communication network, including: partitioning the same frequency band of a first base station transceiver subsystem and a second base station transceiver subsystem, which form redundant cell coverage, into a plurality of resource blocks; partitioning each of the partitioned resource blocks into a first frequency partition (FP) and a second frequency partition which are configured to have the same structure as each other; and transmitting and receiving, by the first base station transceiver subsystem, data using a first resource block allocated to the first frequency partition and by the second base station transceiver subsystem, data using a second resource block allocated to the second frequency partition.

In the transmitting and receiving, the first base station transceiver subsystem may transmit data to a first radio unit (RU) which is a wireless signal processor of the first base station transceiver subsystem, and the second base station transceiver subsystem may transmit data to a second radio unit which is a wireless signal processor of the second base station transceiver subsystem.

In the transmitting and receiving, the first base station transceiver subsystem and the second base station transceiver subsystem may simultaneously transmit data to a first radio unit which is a wireless signal processor of the first base station transceiver subsystem and a second radio unit which is a wireless signal processor of the second base station transceiver subsystem.

In the transmitting and receiving, the first base station transceiver subsystem may receive data from a first radio unit which is the wireless signal processor of the first base station transceiver subsystem and the second base station transceiver subsystem may receive data from a second radio unit which is the wireless signal processor of the second base station transceiver subsystem.

In the transmitting and receiving, the first base station transceiver subsystem and the second base station transceiver subsystem may simultaneously receive data from a first radio unit which is a wireless signal processor of the first base station transceiver subsystem and a second radio unit which is a wireless signal processor of the second base station transceiver subsystem.

A first coverage formed by the first base station transceiver subsystem and a second coverage formed by the second base station transceiver subsystem may have the same cell identification (ID).

The first radio unit and the second radio unit may be installed at a central portion of the cell coverage.

The first radio unit and the second radio unit may be installed at a boundary portion of the cell coverage, including a directional antenna.

The transmitting and receiving may include synchronizing of sharing and controlling timings of transmission signals of the first base station transceiver subsystem and the second base station transceiver subsystem.

The first base station transceiver subsystem and the second base station transceiver subsystem may include a digital unit (DU) which processes digital data.

In accordance with another aspect of the present invention, there is provided an apparatus of redundancy of a wireless communication network, including: a first partition unit configured to partition the same frequency band of a first base station transceiver subsystem and a second base station transceiver subsystem, which form redundant cell coverage, into a plurality of resource blocks; a second partition unit configured to partition each of the partitioned resource blocks into a first frequency partition and a second frequency partition which are configured to have the same structure as each other; and a transmitting and receiving unit configured to be included in the first base station transceiver system to transmit and receive data using the first resource block allocated to the first frequency partition and to be included in the second base station transceiver system to transmit and receive data using the second resource block allocated to the second frequency partition.

The transmitting and receiving unit may include a transmitter configured to allow the first base station transceiver subsystem to transmit data to a first radio unit which is a wireless signal processor of the first base station transceiver subsystem and the second base station transceiver subsystem to transmit data to a second radio unit which is a wireless signal processor of the second base station transceiver subsystem.

The transmitting and receiving unit may include a transmitter configured to allow the first base station transceiver subsystem and the second base station transceiver subsystem to simultaneously transmit data to a first radio unit which is a wireless signal processor of the first base station transceiver subsystem and a second radio unit which is a wireless signal processor of the second base station transceiver subsystem.

The transmitting and receiving unit may include a receiver configured to allow the first base station transceiver subsystem to receive data from a first radio unit which is the wireless signal processor of the first base station transceiver subsystem and the second base station transceiver subsystem to receive data to a second radio unit which is a wireless signal processor of the second base station transceiver subsystem.

The transmitting and receiving unit may include a receiver configured to allow the first base station transceiver subsystem and the second base station transceiver subsystem to simultaneously receive data from a first radio unit which is a wireless signal processor of the first base station transceiver subsystem and a second radio unit which is a wireless signal processor of the second base station transceiver subsystem.

A first coverage formed by the first base station transceiver subsystem and a second coverage formed by the second base station transceiver subsystem may have the same cell identification (ID).

The first radio unit and the second radio unit may be installed at a central portion of the cell coverage.

The first radio unit and the second radio unit may be installed at a boundary portion of the cell coverage, including a directional antenna.

The transmitting and receiving unit may include a synchronizer configured to share and control timings of transmission signals of the first base station transceiver subsystem and the second base station transceiver subsystem.

The first base station transceiver subsystem and the second base station transceiver subsystem may include a digital unit (DU) which processes digital data.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Embodiments of the present invention will be described in detail with reference to the accompanying drawings. In the present specification, an overlapped description and a detailed description for well-known functions and configurations that may obscure the gist of the present invention will be omitted.

To secure reliability and network availability in rail wireless communication, there is a need to implement redundancy of cell coverage. In particular, to implement the redundancy of cell coverage in communication types such as orthogonal frequency division multiplexing (OFDM) which is adopted in the long term evolution (LTE), there is a need to add a resource block.

Figure 1:
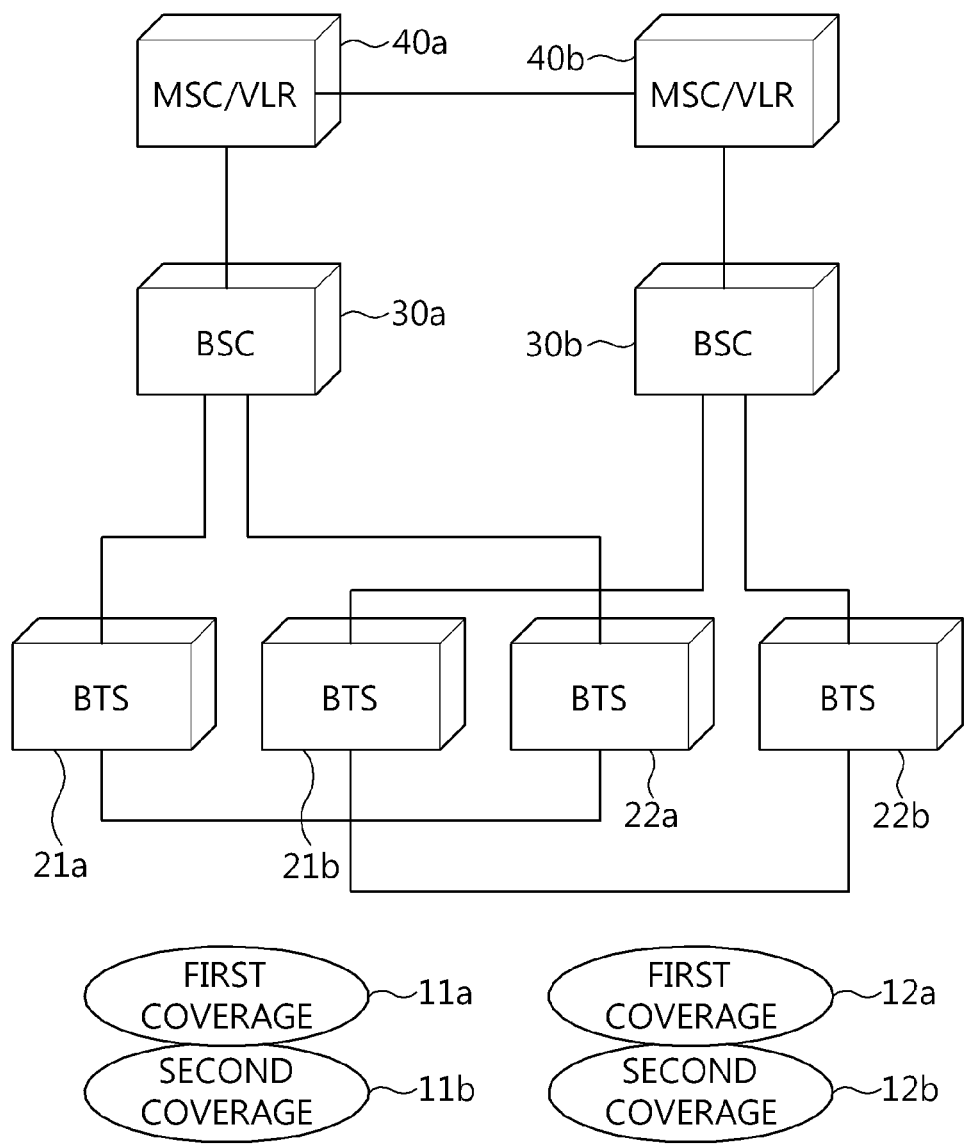
FIG. 1 is a diagram illustrating a redundancy form of a base station transceiver subsystem and a mobile switching center which are configured in a GSM-R.

FIG. 1 illustrates a redundancy form of a base station transceiver subsystem and a mobile switching center which are configured in a global system for mobile communication-railway (GSM-R). As soon as one of the base station transceiver subsystem (BTS) 21a and 22a, one base station controller (BSC) 30a, or one mobile switching center (MSC) 40a are broken, a network is configured to change them to station transceiver subsystems 21b and 22b, a base station controller 30b, and a mobile switching center 40a which are preliminarily prepared.

Herein, a first coverage 11a is cell coverage which is formed by the base station transceiver subsystem 21a and a first coverage 12a is cell coverage which is formed by the base station transceiver subsystem 22a. Further, the second coverage 11b is cell coverage which is formed by the base station transceiver subsystem 21b and the second coverage 12b is cell coverage which is formed by the base station transceiver subsystem 22b. Further, an onboard wireless signal receiver is based on a principle of separately receiving wireless signals (the wireless signals are the same train control signal) transmitted from the first coverages 11a and 12a and the second coverages 11b and 12b, respectively and using only one of the wireless signals and then seamlessly using the wireless signals from the reserved second coverages 11b and 12b which are in a standby state when the receiving signals are suddenly cut off. That is, the onboard wireless signal receiver uses the wireless signals from the first coverage 11a and 12a and adopts a hot-standby which receives the wireless signals from the second coverages 11b and 12b but does not use the wireless signals. Meanwhile, in the case of, for example, the GSM-R, a sub-channel of 200 kHz bandwidth among all the allocated frequency bands is organically allocated to each of the cell coverages and thus may be set to minimize the respective inter-frequency interference, but in the case of the OFDM communication type such as the LTE, one cell coverage uses all the allocated frequency bands other than the sub-channel method. That is, for example, in FIG. 1, since all the specific frequency bandwidths are allocated to the first coverages 11a and 12a, when the overlapping second coverages 11b and 12b are allocated with a new frequency, the same inter-frequency interference may be removed. Therefore, in the case of the LTE, there is a need to additionally allocate a frequency to a reserved base station transceiver subsystem to avoid the same frequency interference.

To achieve the technical problem of the present invention, the embodiment of the present invention relates to a method for redundancy of a network in systems, such as the long term evolution (LTE) and the WiMAX using orthogonal frequency division multiplexing (OFDM) or orthogonal frequency division multiple access (OFDMA), and in particular, to a method for redundancy of a network using fractional frequency reuse (FFR).

Figure 2:
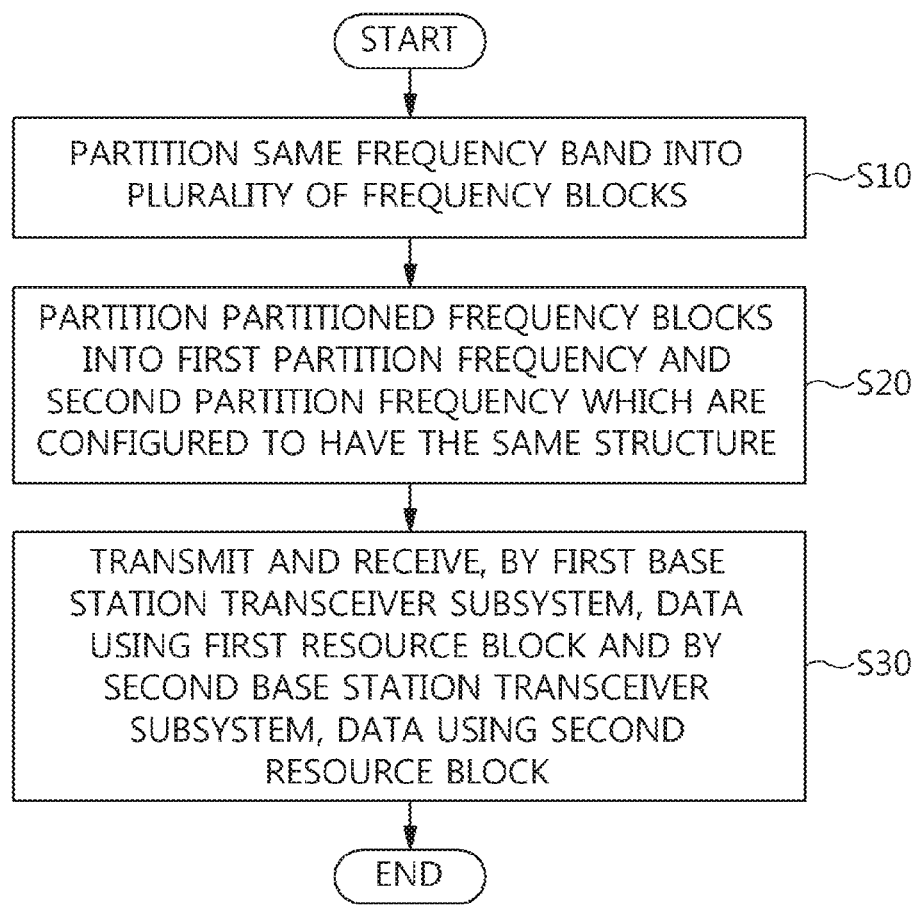
FIG. 2 is a flow chart of a method for redundancy of a wireless communication network according to an embodiment of the present invention.
Figure 3:
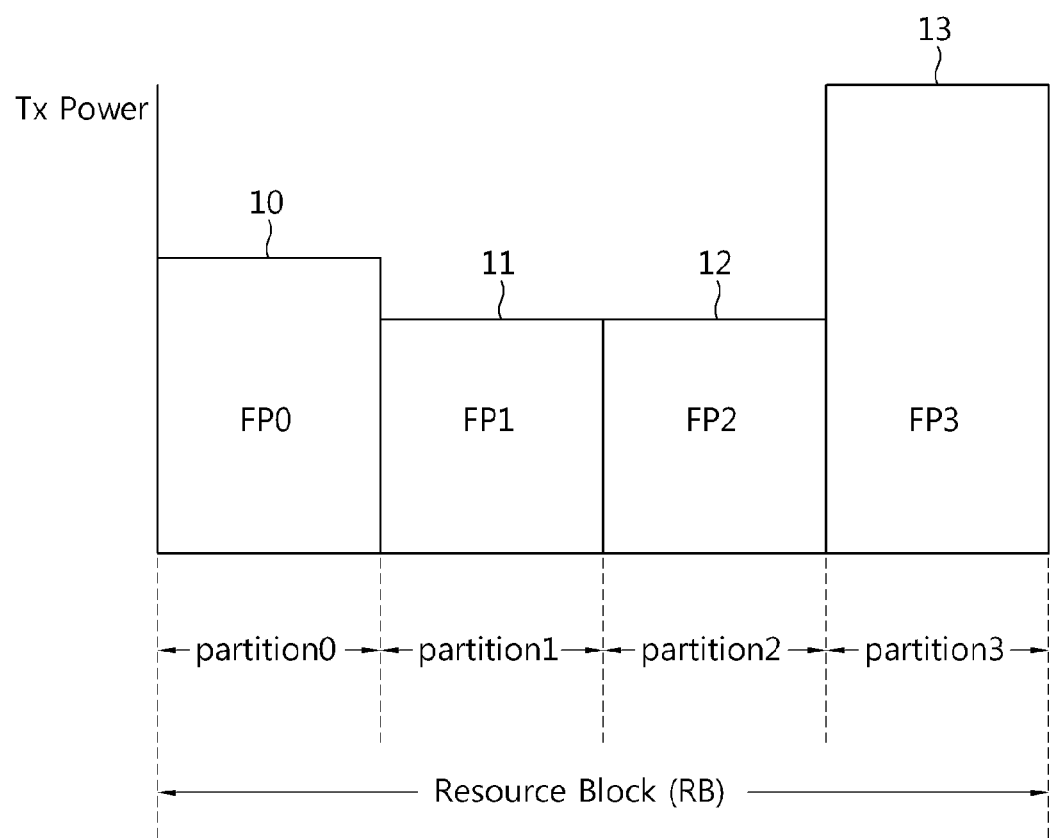
FIG. 3 is a diagram illustrating a form in which a frequency band is partitioned into a plurality of resource blocks, by using the apparatus and method for redundancy of a wireless communication network according to the embodiment of the present invention.
Figure 4:
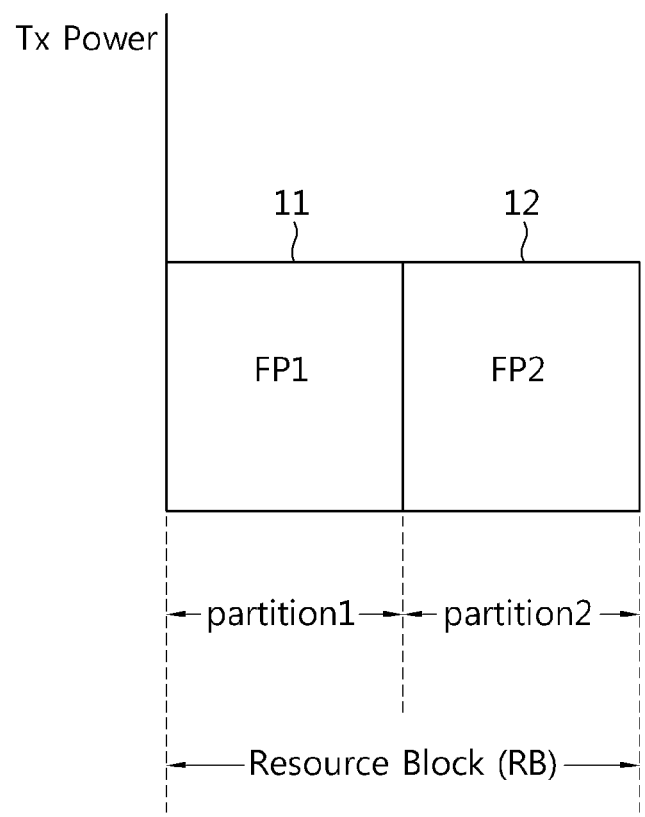
FIG. 4 is a diagram illustrating a form in which the resource blocks partitioned by the apparatus and method for redundancy of a wireless communication network according to the embodiment of the present invention is partitioned into frequency partitions having the same structure.

Hereinafter, the method for redundancy of a wireless communication network according to the embodiment of the present invention will be described. FIG. 2 is a flow chart of a method for redundancy of a wireless communication network according to an exemplary embodiment of the present invention. FIG. 3 is a diagram illustrating a form in which a frequency band is partitioned into a plurality of resource blocks using the apparatus and method for redundancy of a wireless communication network according to the embodiment of the present invention. FIG. 4 is a diagram illustrating a form in which the resource blocks partitioned by the apparatus and method for redundancy of a wireless communication network according to the embodiment of the present invention are partitioned into frequency partitions having the same structure.

Referring to FIG. 2, the method for redundancy of a wireless communication network according to the embodiment of the present invention includes: partitioning the same frequency band of a first base station transceiver subsystem and a second base station transceiver subsystem, which form redundant cell coverage, into a plurality of resource blocks (RB) (S10); partitioning each of the partitioned resource blocks into a first frequency partition and a second frequency partition configured to have the same structure as each other (S20); and transmitting and receiving, by the first base station transceiver subsystem, data using a first resource block allocated to the first frequency partition and by the second base station transceiver subsystem, data using a second resource block allocated to the second frequency partition (S30). The method may be driven by a processor.

Describing step S10 with reference to FIG. 3, the OFDMA based FFR performs permutation on the entire bandwidth using a cell ID to partition the bandwidth into a plurality of resource blocks (RB) and partition each of the RBs into several FP groups using a frequency partition (FP) method. Referring to FIG. 3, one RB is again partitioned into four FP groups. In this case, the four groups become FP0 10, FP1 11, FP2 12, and FP3 13. In this case, the FP to which downlink (DL) or uplink (UL) control information is transmitted becomes a primary frequency partition and one of the plurality of FPs becomes the primary frequency partition. According to the embodiment of the present invention, the FPs are partitioned into two groups by the FFR and the partitioned groups are used for the redundancy of the wireless communication network.

Describing step S20 with reference to FIG. 4, the entire bandwidth 14 is classified into two FPs 11 and 12 by the FFR, in which the FP1 11 is used in the first coverage formed by the first base station transceiver subsystem, the FP2 12 is used in the second coverage formed by the second base station transceiver subsystem, and the first coverage and the second coverage have the same cell identification. This means that the first coverage and the second coverage have the same cell identification and thus the FFR performs the same permutation, and thus the FP1 11 and the FP2 12 form the RBs having the same structure. Therefore, the FP1 11 and the FP2 12 become the RB having the same structure. Further, the first coverage uses the FP1 11 as the primary frequency partition and does not transmit and receive data using the RB which is allocated to the FP2 12. On the other hand, the second coverage uses the FP2 12 as the primary frequency partition and does not use the RB which is allocated to the FP1 11. The FFR method is applied to the DL and the UL, respectively and the control channels having the same structure are allocated to the FPs of the DL and the UL, respectively. Step S30 which is the transmitting and receiving will be described below with reference to the embodiment.

Figure 5:
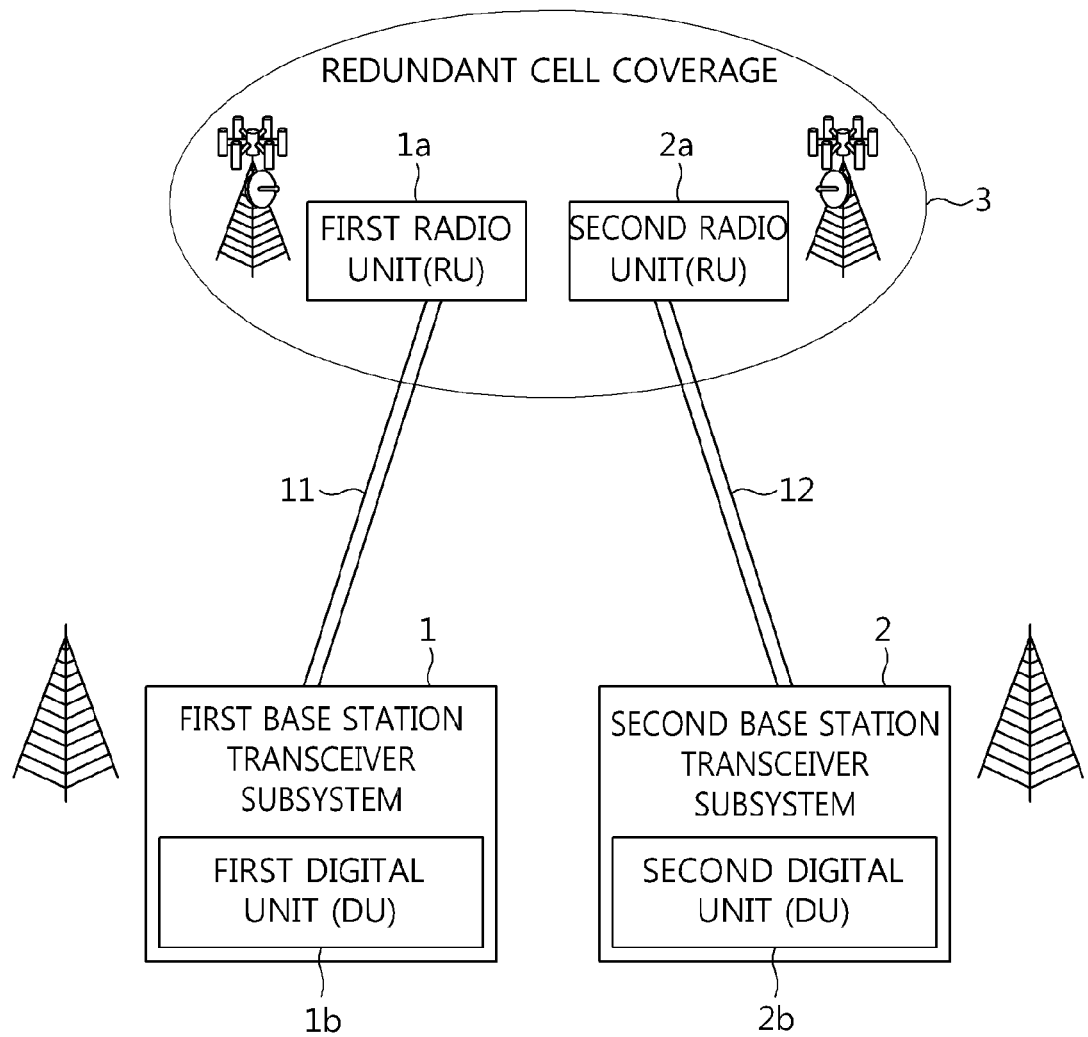
FIG. 5 is a diagram illustrating an apparatus and a method for redundancy of a wireless communication network according to an embodiment of the present invention.

Hereinafter, the method for redundancy of a wireless communication network using the FFR method according to the embodiment of the present invention will be described. FIG. 5 is a diagram illustrating an apparatus and a method for redundancy of a wireless communication network according to an embodiment of the present invention. In this case, the redundancy of the LTE based wireless communication network is described by way of example, but may be applied to all the OFDM or OFMDA based networks such as WiMAX.

In the LTE network, an eNodeB is divided into a digital unit (DU) and a radio unit (RU). The digital unit is a unit which processes digital data and processes digital signals such as a packet data convergence part (PDCP), a radio link control (RLC), channel coding, and modulation. The radio unit is a unit which processing analog data and processes a radio frequency signal transmitting and receiving function. FIG. 5 illustrates the redundancy of the LTE network using the FFR method. That is, the first base station transceiver subsystem 1 and the second base station transceiver subsystem 2 including the same frequency band form a redundant cell coverage 3. The first base station transceiver subsystem 1 and the second base station transceiver subsystem 2 serve the same cell coverage 3, having the same cell identification. Referring to FIGS. 4 and 5, the first base station transceiver subsystem 1 uses the FP1 11 as the primary frequency partition to transmit and receive data and does not use the RB allocated to the FP2 12. On the other hand, the second base station transceiver subsystem 2 uses the FP2 12 as the primary frequency partition and does not use the RB which is allocated to the FP1 11. Terminals within the redundant cell coverage 3 which is formed by the first base station transceiver subsystem 1 and the second base station transceiver subsystem 2 simultaneously receive data from the FP1 11 and the FP2 12.

The first base station transceiver subsystem 1 is configured of a first radio unit 1*a* and a first digital unit 1*b* and the second base station transceiver subsystem 2 is configured of a second radio unit 2*a* and a second digital unit 2*b*. The first radio unit 1*a* which is a configuration of the first base station transceiver subsystem 1 and the second radio unit 2*a* which is a configuration of the second base station transceiver subsystem 2 are installed at a central part of the redundant cell coverage 3. In this case, the first radio unit 1*a* converts the data received by the first base station transceiver subsystem 1 into an RF signal and transmits the RF signal and the second radio unit 2*a* converts the data received by the second base station transceiver subsystem 2 into the RF signal and transmits the RF signal. The RF signals of the first radio unit 1*a* and the second radio unit 2*a* are combined with each other on wireless communication and are then transmitted to the terminals, but use the same cell identification to configure the RB and thus do not interfere with each other. Further, the first radio unit 1*a* receives the UL data from the FP1 11 and transmits the received UL data to the first base station transceiver subsystem 1 and the second radio unit 2*a* receives the UL data from the FP2 12 and transmits the received UL data to the second base station transceiver subsystem 2. Further, the transmitting and receiving (S30) may further include synchronizing of sharing and controlling timings of the transmission signals of the first base station transceiver subsystem 1 and the second base station transceiver subsystem 2. By the synchronizing, when the transmission signals of the first base station transceiver subsystem 1 and the second base station transceiver subsystem 2 are simultaneously transmitted, more robust and efficient receiver sensitivity may be formed.

Figure 6:
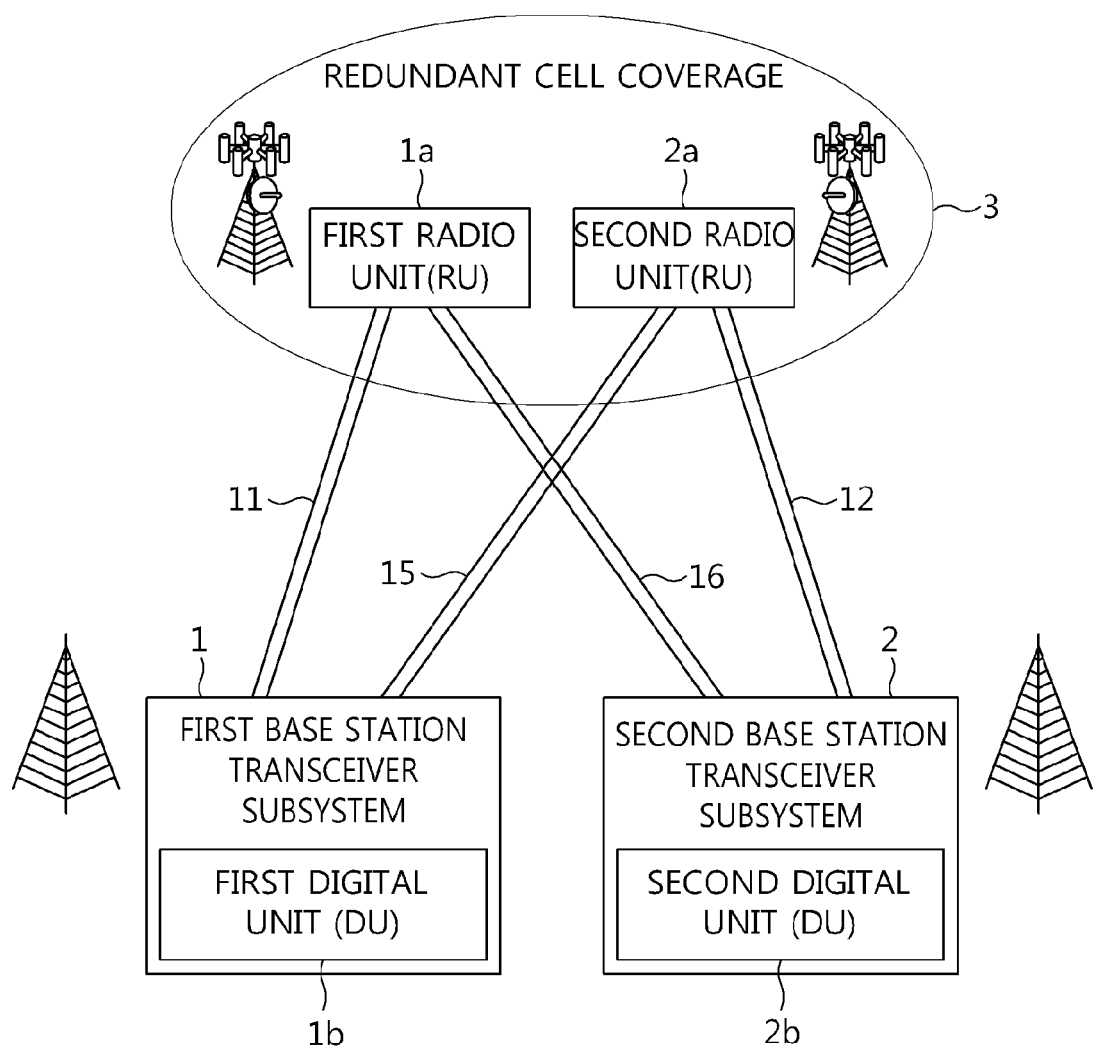
FIG. 6 is a diagram illustrating an apparatus and a method for redundancy of a wireless communication network according to another embodiment of the present invention.

Hereinafter, a method for redundancy of a wireless communication network using the FFR method according to another embodiment of the present invention will be described. FIG. 6 is a diagram illustrating an apparatus and a method for redundancy of a wireless communication network according to another embodiment of the present invention.

Referring to FIGS. 4 and 6, the first radio unit 1*a* and the second radio unit 2*a* are installed at the central portion of the redundant cell coverage 3 and the first radio unit 1*a* and the second radio unit 2*a* each receive data from the first base station transceiver subsystem 1 and the second base station transceiver subsystem 2 and convert the received data into the RF signals and then simultaneously transmit the RF signals on wireless communication. As a result, one radio unit simultaneously transmits a signal to the FP1 11 and FP2 12 and an FP1 11*a* and an FP2 12*a* combines signals transmitted from each of the radio units without interfering with each other on wireless communication, thereby more improving the signal quality. This is possible because the RB is configured using the same cell identification.

Figure 7:
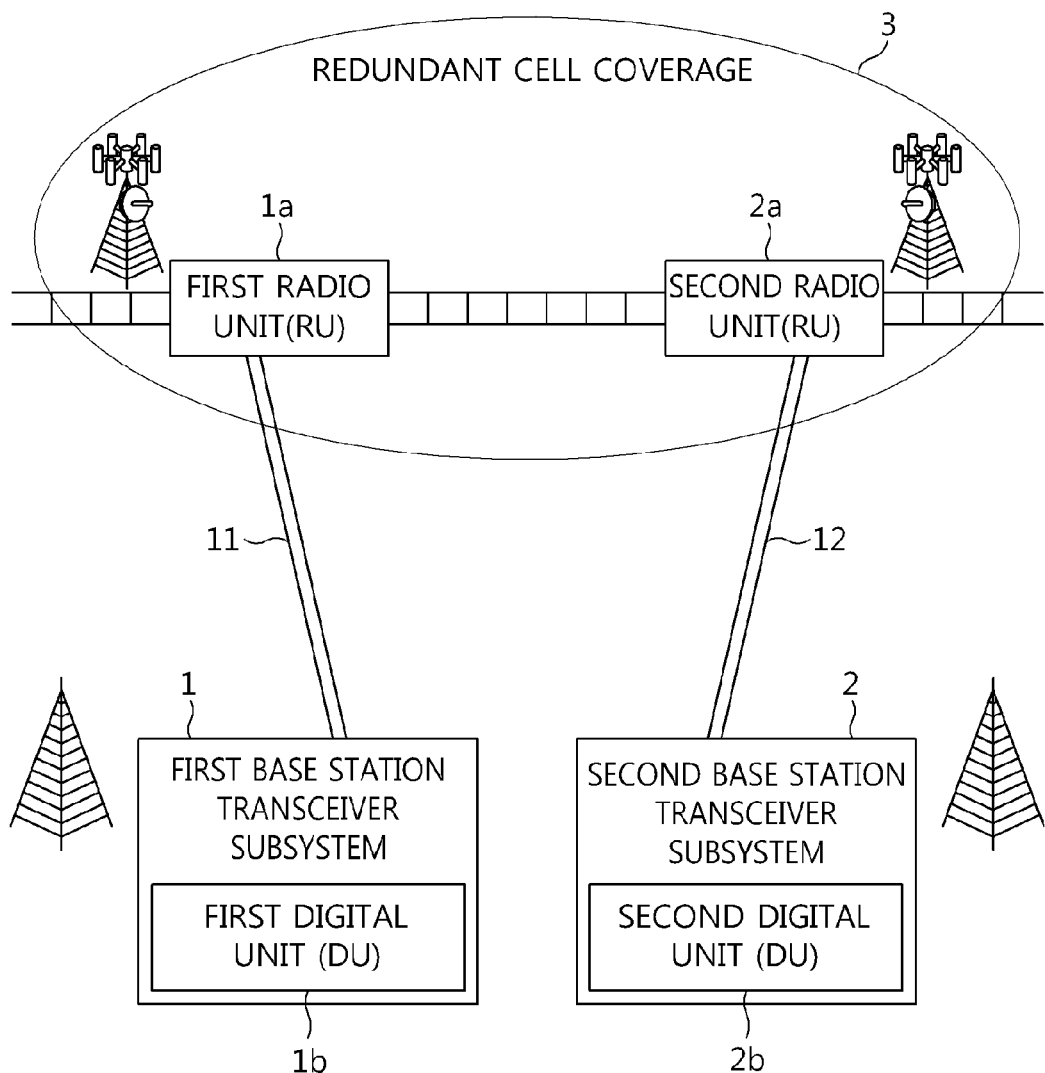
FIG. 7 is a diagram illustrating an apparatus and a method for redundancy of a wireless communication network according to still another embodiment of the present invention.

Hereinafter, a method for redundancy of a wireless communication network using the FFR method according to another embodiment of the present invention will be described. FIG. 7 is a diagram illustrating an apparatus and a method for redundancy of a wireless communication network according to still yet another embodiment of the present invention.

Referring to FIGS. 4 and 7, the railway communication configures the redundant cell coverage 3 along a railway. In this case, the first radio unit 1*a* which is a component of the first base station transceiver subsystem 1 in which directional antennas are installed at a boundary portion of the cell coverage at both end portions of a railway and the second radio unit 2*a* which is a component of the second radio transceiver subsystem 2 in which the directional antennas are installed at the boundary portion of the cell coverage at both end portions of a railway are constructed. In this case, the first radio unit 1*a* converts the signal of the FP1 11 received from the first base station transceiver subsystem 1 into the RF signal and transmits the RF signal on the wireless communication and the second radio unit 2*a* converts the signal of the FP2 12 into the RF signal and transmits the RF signal on the wireless communication. In this case, when a train moves across cells along a railway, a train may select and receive a good signal from the signals received by the FP1 11 and the FP2 12.

Figure 8:
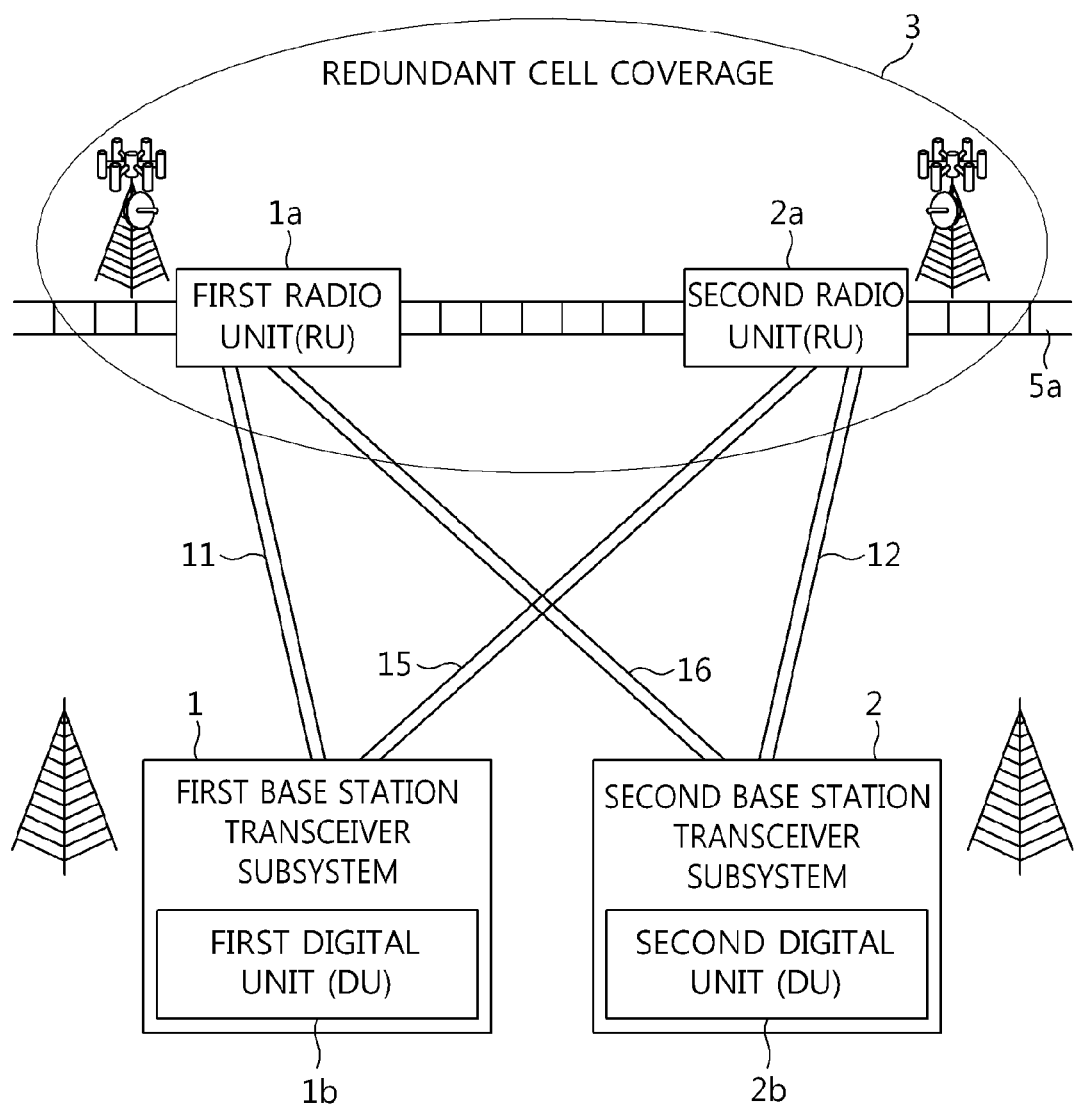
FIG. 8 is a diagram illustrating an apparatus and a method for redundancy of a wireless communication network according to still yet another embodiment of the present invention.

Hereinafter, a method for redundancy of a wireless communication network using the FFR method according to another embodiment of the present invention will be described. FIG. 8 is a diagram illustrating an apparatus and a method for redundancy of a wireless communication network according to still yet another embodiment of the present invention.

Referring to FIGS. 4 and 8, the railway communication configures the redundant cell coverage 3 along a railway. The first radio unit 1*a* which is a component of the first base station transceiver subsystem 1 in which directional antennas are installed and the second radio unit 2*a* which is a component of the second radio transceiver subsystem 2 in which the directional antennas are installed are constructed. In this case, the first radio unit 1*a* and the second radio unit 2*a* each receive data from the first base station transceiver subsystem 1 and the second base station transceiver subsystem 2 and convert the received data into the RF signals and then simultaneously transmit the RF signals on the wireless communication. As a result, one radio unit simultaneously transmits a signal to the FP1 11 and FP2 12 and the FP1 11*a* and the FP2 12*a* combines the signals transmitted from each of the radio units without interfering with each other on wireless communication, thereby more improving the signal quality. This is possible because the RB is configured using the same cell identification.

Figure 9:
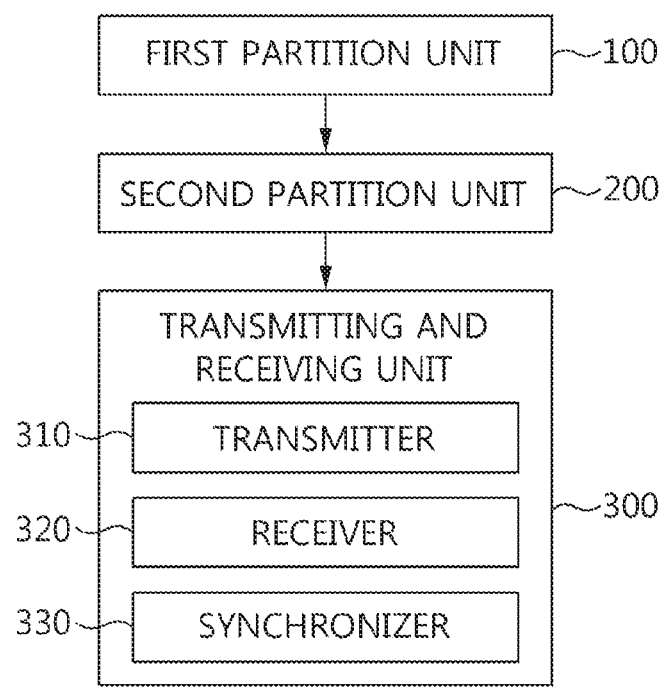
FIG. 9 is a block diagram of the apparatus for redundancy of a wireless communication network according to the embodiment of the present invention.

Hereinafter, a configuration and an action of the apparatus for redundancy of a wireless communication network using the FFR method according to the embodiment of the present invention will be described. FIG. 9 is a block diagram of the apparatus for redundancy of a wireless communication network according to the embodiment of the present invention.

Referring to FIG. 9, the apparatus for redundancy of a wireless communication network according to the embodiment of the present invention includes: a first partition unit 100 configured to partition the same frequency band of the first base station transceiver subsystem and the second base station transceiver subsystem, which form the redundant cell coverage, into the plurality of resource blocks (RBs); a second partition unit 200 configured to partition each of the partitioned resource blocks into the first frequency partition and the second frequency partition configured to have the same structure as each other; and a transmitting and receiving unit 300 configured to be included in the first base station transceiver subsystem to transmit and receive data using the first resource block allocated to the first frequency partition and to be included in the second base station transceiver subsystem to transmit and receive data using the second resource block allocated to the second frequency partition. In this case, a transmitting and receiving unit 300 may include a transmitter 310, a receiver 320, and a synchronizer 330.

The transmitter 310 may allow the first base station transceiver subsystem to transmit data to the first radio unit which is a wireless signal processor of the first base station transceiver subsystem and the second base station transceiver subsystem to transmit data to the second radio unit which is a wireless signal processor of the second base station transceiver subsystem. Further, the transmitter 310 may allow the first base station transceiver subsystem and the second base station transceiver subsystem to simultaneously transmit data to the first radio unit which is the wireless signal processor of the first base station transceiver subsystem and the second radio unit which is the wireless signal processor of the second base station transceiver subsystem.

The receiver 320 may allow the first base station transceiver subsystem to receive data from the first radio unit which is the wireless signal processor of the first base station transceiver subsystem and the second base station transceiver subsystem to receive data from the second radio unit which is the wireless signal processor of the second base station transceiver subsystem. Further, the receiver 320 may allow the first base station transceiver subsystem and the second base station transceiver subsystem to simultaneously receive data from the first radio unit which is the wireless signal processor of the first base station transceiver subsystem and the second radio unit which is the wireless signal processor of the second base station transceiver subsystem.

The synchronizer 330 shares and controls the timing of the transmission signals of the first base station transceiver subsystem and the second base station transceiver subsystem to serve to form more robust and efficient receiver sensitivity when the transmission signals of the first base station transceiver subsystem and the second base station transceiver subsystem are simultaneously transmitted.

Further, the first coverage formed by the first base station transceiver subsystem and the second coverage formed by the second base station transceiver subsystem have the same cell identification (ID). Therefore, the interference between the signal transmitted from the first base station transceiver subsystem and the signal transmitted from the second base station transceiver subsystem is prevented. Further, the first radio unit which is a component of the first base station transceiver subsystem and the second radio unit which is a component of the second base station transceiver subsystem may be installed at the central portion of the redundant cell coverage formed by the first base station transceiver station and the second base station transceiver station and may also be installed at the boundary portion thereof. In the case in which the first radio unit and the second radio unit are installed including the directional antennas which are installed at the boundary portion of the redundant cell coverage, when a train moves across the cell coverage along a railway, the train may select and receive a good signal from the signals received by the first base station transceiver subsystem and the second base station transceiver subsystem.

According to the embodiments of the present invention, it is possible to construct the efficient wireless communication network by performing the frequency allocation using the same cell identification, in the redundancy structure of the railway wireless communication network of which the reliability and stability need to be secured.

Further, it is possible to improve the wireless signal quality by effectively disposing the radio unit.

In addition, it is possible to improve the receiver sensitivity by synchronizing the signals from each of the base station transceiver subsystems in the redundancy structure of the railway wireless communication network of which the reliability and stability need to be secured.

As described above, the method and apparatus for redundancy of a wireless communication network according to the embodiments of the present invention are not restrictively applied. That is, all or some of the respective exemplary embodiments may be selectively combined with each other so that they may be various modified.

What is claimed is:

1. A method for maintaining redundancy of a wireless communication network, comprising:
   partitioning a frequency band that is used by both a first base station transceiver subsystem and a second base station transceiver subsystem into a plurality of resource blocks;
   partitioning each of the partitioned resource blocks into a first frequency partition and a second frequency partition which are configured to have a same structure as each other; and
   transmitting and receiving,
      by the first base station transceiver subsystem, first data using a first resource block allocated to the first frequency partition, and
      by the second base station transceiver subsystem, second data using a second resource block allocated to the second frequency partition,
   wherein a first coverage formed by the first base station transceiver subsystem and a second coverage formed by the second base station transceiver subsystem have a substantially same cell coverage and a same cell identification (ID), to thereby provide a redundant cell coverage.

2. The method of claim 1, wherein in the transmitting and receiving, the first base station transceiver subsystem transmits the first data to a first radio unit which is a wireless signal processor of the first base station transceiver subsystem, and
   the second base station transceiver subsystem transmits the second data to a second radio unit which is a wireless signal processor of the second base station transceiver subsystem.

3. The method of claim 2, wherein the first radio unit and the second radio unit are installed at a central portion of the cell coverage.

4. The method of claim 2, wherein the first radio unit and the second radio unit is installed at a boundary portion of the cell coverage, including a directional antenna.

5. The method of claim 1, wherein in the transmitting and receiving, the first base station transceiver subsystem and the second base station transceiver subsystem simultaneously transmit the first and second data to a first radio unit which is a wireless signal processor of the first base station transceiver subsystem and a second radio unit which is a wireless signal processor of the second base station transceiver subsystem.

6. The method of claim 1, wherein in the transmitting and receiving, the first base station transceiver subsystem receives the first data from a first radio unit which is the wireless signal processor of the first base station transceiver subsystem and
the second base station transceiver subsystem receives the second data from a second radio unit which is the wireless signal processor of the second base station transceiver subsystem.

7. The method of claim 1, wherein in the transmitting and receiving, the first base station transceiver subsystem and the second base station transceiver subsystem simultaneously receive the first and second data from a first radio unit which is a wireless signal processor of the first base station transceiver subsystem and a second radio unit which is a wireless signal processor of the second base station transceiver subsystem.

8. The method of claim 1, wherein the transmitting and receiving comprises synchronizing of sharing and controlling timings of transmission signals of the first base station transceiver subsystem and the second base station transceiver subsystem.

9. The method of claim 1, wherein the first base station transceiver subsystem and the second base station transceiver subsystem include a digital unit which processes digital data.

10. An apparatus for maintaining redundancy of a wireless communication network, comprising:
a first partition unit configured to partition a frequency band that is used by both a first base station transceiver subsystem and a second base station transceiver subsystem into a plurality of resource blocks;
a second partition unit configured to partition each of the partitioned resource blocks into a first frequency partition and a second frequency partition which are configured to have the same structure as each other; and
a transmitting and receiving unit configured
to be included in the first base station transceiver subsystem to transmit and receive first data using the first resource block allocated to the first frequency partition, and
to be included in the second base station transceiver subsystem to transmit and receive second data using the second resource block allocated to the second frequency partition,
wherein a first coverage formed by the first base station transceiver subsystem and a second coverage formed by the second base station transceiver subsystem have a substantially same cell coverage and a same cell identification (ID), thereby to provide a redundant cell coverage.

11. The apparatus of claim 10, wherein the transmitting and receiving unit comprises a transmitter configured to allow the first base station transceiver subsystem to transmit the first data to a first radio unit which is a wireless signal processor of the first base station transceiver subsystem and
the second base station transceiver subsystem to transmit the second data to a second radio unit which is a wireless signal processor of the second base station transceiver subsystem.

12. The apparatus of claim 11, wherein the first radio unit and the second radio unit are installed at a central portion of the cell coverage.

13. The apparatus of claim 11, wherein the first radio unit and the second radio unit are installed at a boundary portion of the cell coverage, including a directional antenna.

14. The apparatus of claim 10, wherein the transmitting and receiving unit comprises a transmitter configured to allow the first base station transceiver subsystem and the second base station transceiver subsystem to simultaneously transmit the first and second data to a first radio unit which is a wireless signal processor of the first base station transceiver subsystem and a second radio unit which is a wireless signal processor of the second base station transceiver subsystem.

15. The apparatus of claim 10, wherein the transmitting and receiving unit comprises a receiver configured to allow the first base station transceiver subsystem to receive the first data from a first radio unit which is the wireless signal processor of the first base station transceiver subsystem and
the second base station transceiver subsystem to receive the second data to a second radio unit which is a wireless signal processor of the second base station transceiver subsystem.

16. The apparatus of claim 10, wherein the transmitting and receiving unit comprises a receiver configured to allow the first base station transceiver subsystem and the second base station transceiver subsystem to simultaneously receive the first and second data from a first radio unit which is a wireless signal processor of the first base station transceiver subsystem and a second radio unit which is a wireless signal processor of the second base station transceiver subsystem.

17. The apparatus of claim 10, wherein the transmitting and receiving unit comprises synchronizer configured to share and control timings of transmission signals of the first base station transceiver subsystem and the second base station transceiver subsystem.

18. The apparatus of claim 10, wherein the first base station transceiver subsystem and the second base station transceiver subsystem comprise a digital unit which processes digital data.

* * * * *